(12) United States Patent
Doi

(10) Patent No.: US 8,190,853 B2
(45) Date of Patent: May 29, 2012

(54) CALCULATOR AND TLB CONTROL METHOD

(75) Inventor: Masanori Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 232 days.

(21) Appl. No.: 12/654,303

(22) Filed: Dec. 16, 2009

(65) Prior Publication Data

US 2010/0106936 A1    Apr. 29, 2010

Related U.S. Application Data

(63) Continuation of application No. PCT/JP2007/062462, filed on Jun. 20, 2007.

(51) Int. Cl.
*G06F 12/10* (2006.01)

(52) U.S. Cl. ........ 711/207; 711/202; 711/203; 711/204; 711/205; 711/206; 711/208; 711/209

(58) Field of Classification Search ........... 711/202–209
See application file for complete search history.

(56) References Cited

U.S. PATENT DOCUMENTS

| | | | |
|---|---|---|---|
| 4,725,776 A | 2/1988 | Onodera et al. | |
| 5,263,140 A * | 11/1993 | Riordan | 711/207 |
| 5,386,527 A | 1/1995 | Bosshart | |
| 5,465,337 A * | 11/1995 | Kong | 711/207 |
| 5,526,504 A | 6/1996 | Hsu et al. | |
| 5,907,867 A | 5/1999 | Shinbo et al. | |
| 6,493,812 B1 * | 12/2002 | Lyon | 711/207 |
| 7,243,208 B2 * | 7/2007 | Ito et al. | 711/207 |
| 2005/0027962 A1 | 2/2005 | Zhang et al. | |

FOREIGN PATENT DOCUMENTS

| | | |
|---|---|---|
| EP | 0 496 288 | 7/1992 |
| EP | 0 810 527 | 12/1997 |
| JP | 58-17586 | 2/1983 |
| JP | 4-311233 | 11/1992 |
| JP | 5-46483 | 2/1993 |
| JP | 5-225064 | 9/1993 |
| JP | 6-202954 | 7/1994 |
| JP | 6-222996 | 8/1994 |

(Continued)

OTHER PUBLICATIONS

The Extended European Search Report for the corresponding European Application No. 07 76 7300, mailed on Sep. 14, 2010.

(Continued)

*Primary Examiner* — Arpan P. Savla
(74) *Attorney, Agent, or Firm* — Staas & Halsey, LLP

(57) ABSTRACT

A calculator includes a main TLB that stores therein a plurality of address translation pairs indicating a correspondence of a virtual address and an absolute address as a page table and a micro TLB that stores therein part of the page table stored in the main TLB. In the micro TLB, a TLB virtual address [63:13] and a TLB absolute address [46:13] are registered in a correlated manner. With such configuration, when registering an address translation pair in the micro TLB, the calculator chops the address translation pair to a page size of a first size or a fourth size to register it in the micro TLB. Upon receiving an address translation request, the calculator searches for an address corresponding to the page size of the first size or the fourth size registered in the micro TLB, so that address comparison conditions can be reduced, enabling to improve a processing performance.

6 Claims, 8 Drawing Sheets

FOREIGN PATENT DOCUMENTS

| | | |
|---|---|---|
| JP | 2002-132581 | 5/2002 |
| JP | 2002-149490 | 5/2002 |
| JP | 2007-504552 | 3/2007 |
| WO | 2005/024635 | 3/2005 |

OTHER PUBLICATIONS

Japanese Office Action for corresponding Japanese Patent Application No. 2009-520202, issued on Jun. 11, 2010.

Japanese Office Action for related Japanese Patent Application No. 2009-520202, issued on May 19, 2011.

International Search Report for PCT/JP2007/062462, mailed Sep. 18, 2007.

* cited by examiner

CALCULATOR AND TLB CONTROL METHOD

CROSS-REFERENCE TO RELATED APPLICATION(S)

This application is a continuation of International Application No. PCT/JP2007/062462, filed on Jun. 20, 2007, the entire contents of which are incorporated herein by reference.

FIELD

The embodiments discussed herein are directed to a calculator that includes a main TLB that stores therein a plurality of address translation pairs indicating a correspondence of a virtual address and an absolute address as a page table and a micro TLB that stores therein part of the page table stored in the main TLB.

BACKGROUND

Conventionally, a computer employing a virtual memory system stores a list called a page table for translating a virtual address (VA) into a physical address (PA) in a main storage (main memory). If the computer refers to the page table in the main storage in every address translation, long time is required, so that the computer normally includes a cache dedicated for address translation called a TLB (Translation-lookaside buffer) in a CPU (Central Processing Unit).

When accessing a memory, an operation unit or an instruction control unit of the computer translates a virtual address into a physical address by the TLB and accesses the memory directly by using the physical address, so that the access speed of the TLB directly influences the speed of the memory access. For increasing the access speed of the TLB, the capacity of the TLB needs to be made small. However, if the capacity is too small, a TLB miss occurs frequently, thereby increasing the access time. On the other hand, if the capacity of the TLB is too large, the time for searching becomes long, which may inhibit improvement of a hardware performance. A technology of configuring the TLB in two levels is often employed as a method for improving the hardware performance while shortening the access time.

The TLB having two levels consists of an MTLB (main TLB) of a large capacity that stores therein address translation pairs transferred from the main storage and an MTLB (micro TLB) of a small capacity that stores therein address translation information that was searched in the past. When performing address translation, the micro TLB searches for an address translation pair (entry) by using a virtual address and a context bit of a request, and a TLB virtual address, a TLB context bit, and page size information registered in the TLB, and translates the virtual address into an absolute address if matching a valid entry.

The page size registered in the TLB is six kinds of 8 KByte, 64 KByte, 512 KByte, 4 MByte, 32 MByte, and 256 MByte (hereinafter, sometimes simply referred to as 8 K, 64 K, 512 K, 4 M, 32 M, and 256 M, respectively). There is a page offset of a virtual address depending on the page size. Therefore, when performing address translation, the micro TLB judges an offset address of the virtual address to be compared based on the page size of a requested entry and removes the offset, thereby performing the address translation searching only with a valid virtual address (see Japanese Laid-open Patent Publication No. 05-225064).

However, in the above conventional technology, a problem arises in that the processing performance degrades because the number of address comparison conditions is large. To specifically explain the problem, as depicted in FIG. 7, an offset corresponding to a page size is added to a search request output from an operation unit or an instruction control unit of a CPU to the micro TLB together with a virtual address. The micro TLB compares the virtual address in which the offset calculated based on the input search request is removed from the search request with the registered virtual address. When they match with each other, the micro TLB responds with an absolute address. The offset added is different depending on the page size, so that the micro TLB includes a comparison circuit, which compares the virtual address calculated by detecting the page size of the input search request and removing the offset, for each page size as depicted in FIG. 8. Consequently, because the number of the address comparison conditions becomes large with respect to the input search request, the processing performance of the micro TLB degrades. FIG. 7 is a schematic diagram for explaining the conventional technology. FIG. 8 is a schematic diagram illustrating an example of an address translation pair searching circuit in the conventional technology.

SUMMARY

According to an aspect of an embodiment of the invention, a calculator includes a main TLB that stores therein a plurality of address translation pairs indicating a correspondence of a virtual address and an absolute address as a page table; a micro TLB that stores therein part of the page table stored in the main TLB; a page-size detecting unit that, when an address translation pair stored in the main TLB is read and is registered in the micro TLB, detects a page size of the read address translation pair; a number-of-bit determining unit that chops the read address translation pair to a predetermined page size in accordance with the page size detected by the page-size detecting unit, and determines the number of bits of a virtual address to be added to an absolute address included in the chopped address translation pair; a registering unit that adds the virtual address with respect to the number of bits determined by the number-of-bit determining unit and adds chop information indicating that the address translation pair is chopped to the predetermined size to the chopped address translation pair to register in the micro TLB; an address searching unit that, when receiving an address translation request from the virtual address into the physical address from a processor, determines a search target bit of the address translation request for searching address translation pairs registered in the micro TLB from the chop information of the address translation pair registered in the micro TLB by the registering unit, and searches the micro TLB for an address translation pair in which a virtual address indicated by the determined search target bit and a context included in the address translation request are registered in a correlated manner; and an address responding unit that, when the address translation pair in which the virtual address indicated by the search target bit and the context included in the address translation request are registered in a correlated manner is found from the micro TLB by the address searching unit, calculates an absolute address from the address translation pair and responds to the processor, and, when the address translation pair is not found by the address searching unit, sends the address translation request to the main TLB.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to the accompanying drawings. The outline and characteristics of the calculator (arithmetic processing unit) according to the present embodiment and a configuration and a processing flow of the calculator are sequentially explained, and finally various modification examples of the present embodiment are explained.

[a] First Embodiment

Outline and Characteristics of Calculator

Figure 1:
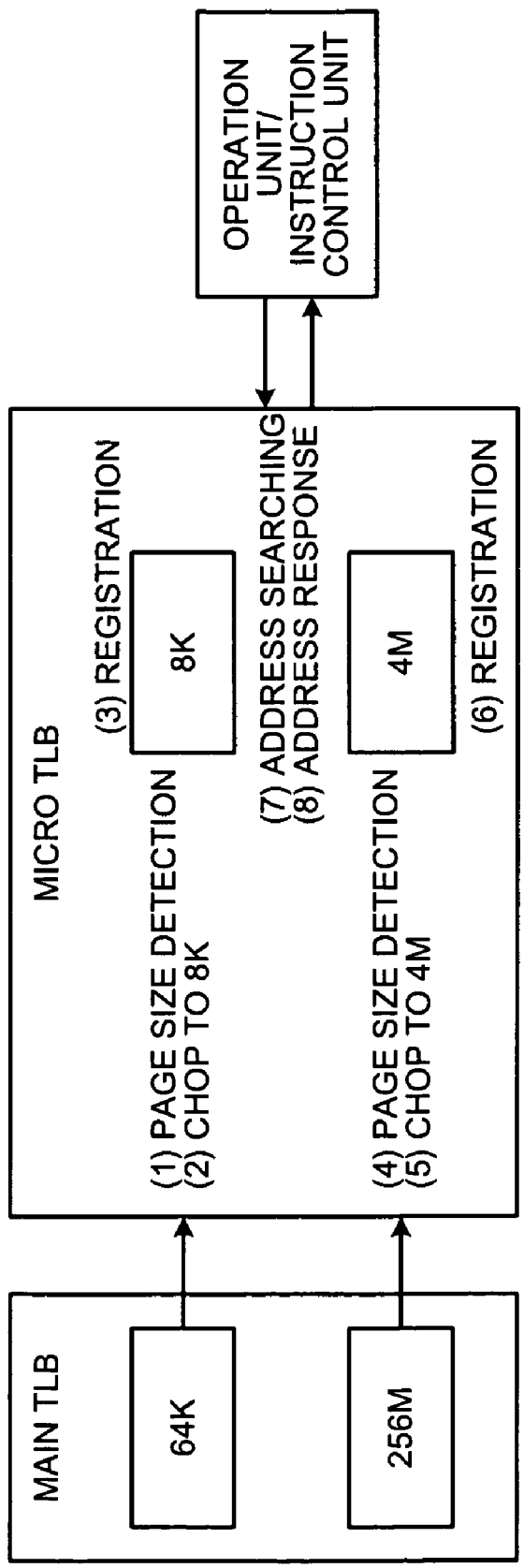
FIG. 1 is a schematic diagram for explaining an outline and characteristics of a calculator according to a first embodiment.

First, the outline and characteristics of the calculator according to a first embodiment are explained with reference to FIG. 1. FIG. 1 is a schematic diagram for explaining the outline and characteristics of the calculator according to the first embodiment.

As depicted in FIG. 1, the calculator includes a main TLB that stores therein a plurality of address translation pairs indicating a correspondence of a virtual address and an absolute address as a page table and a micro TLB that stores therein part of the page table stored in the main TLB. A TLB virtual address [63:13] and a TLB absolute address [46:13] are registered in the micro TLB in a correlated manner.

A basic operation of the main TLB and the micro TLB is explained. For example, when an address translation request for requesting translation of the virtual address into a physical address is output from an operation unit, an instruction control unit, or the like of a CPU, the calculator inputs the address translation request to the micro TLB. Then, the calculator determines a range of the virtual address as a search target from a page size of an entry stored in the micro TLB, and judges whether the value of the range of the virtual address included in the determined address translation request matches an address translation pair stored in the micro TLB. When the calculator judges that the value matches the address translation pair stored in the micro TLB (micro TLB hit), the calculator responds to the operation unit or the instruction control unit with a corresponding absolute address. When the calculator judges that the value does not match the address translation pair stored in the micro TLB (micro TLB miss), the calculator outputs the address translation request to the main TLB.

When the address translation request is input to the main TLB, the calculator searches address translation pairs stored in the main TLB in the same manner as the micro TLB. When there is a matching entry, the calculator reads out a corresponding address translation pair and outputs it to the micro TLB. When a matching address translation pair is not stored in the main TLB, the calculator outputs the address translation request to the main storing unit (main memory), and the main storing unit responds to the main TLB with the absolute address corresponding to the address translation request. The address translation pair is a correspondence table in which the virtual address is correlated with the physical address. When the address translation request including the virtual address is input, the main TLB or the micro TLB searches the address translation pairs stored therein for the physical address corresponding to the virtual address.

In this state, as described above, the calculator is summarized in that the calculator responds to the address translation request from the operation unit, the instruction control unit, or the like with the absolute address stored in the main TLB, the micro TLB, or the main storing unit. Particularly, the calculator is mainly characterized in that address comparison conditions can be reduced and thereby the processing performance can be improved.

The main characteristics of the calculator are specifically explained. When the address translation pair stored in the main TLB is read and registered in the micro TLB, the calculator detects a page size of the read address translation pair (see (1) in FIG. 1). To give a specific example, when the address translation request is output from the operation unit, the instruction control unit, or the like of the CPU, the calculator inputs the address translation request to the micro TLB. Then, when the micro TLB miss occurs, the calculator outputs the address translation request to the main TLB and responds with the physical address from the main TLB. The calculator outputs the address translation pair with respect to the address translation request out of the address translation pairs stored in the main TLB to the micro TLB. Then, the calculator detects whether the page size of the address translation pair output from the main TLB is 8 KByte, 64 KByte, 512 KByte, 4 MByte, 32 MByte, or 256 MByte.

Next, the calculator chops the read address translation pair to a predetermined page size in accordance with the detected page size, and determines a bit of the virtual address to be added to the absolute address included in the chopped address translation pair (see (2) in FIG. 1). To give a specific example, when the page size of 64 K (or 512 K) is read from the main TLB and the page size is detected, the calculator chops the read address translation pair to the page size of 8 K. In other words, the calculator deletes an offset address that is not needed in the address translation pair searching. Then, the calculator determines the bit of the virtual address to be added to the absolute address included in the address translation pair with an original size of 64K, which is chopped to 8 K, to 15 bit to 13 bit.

Figure 3:
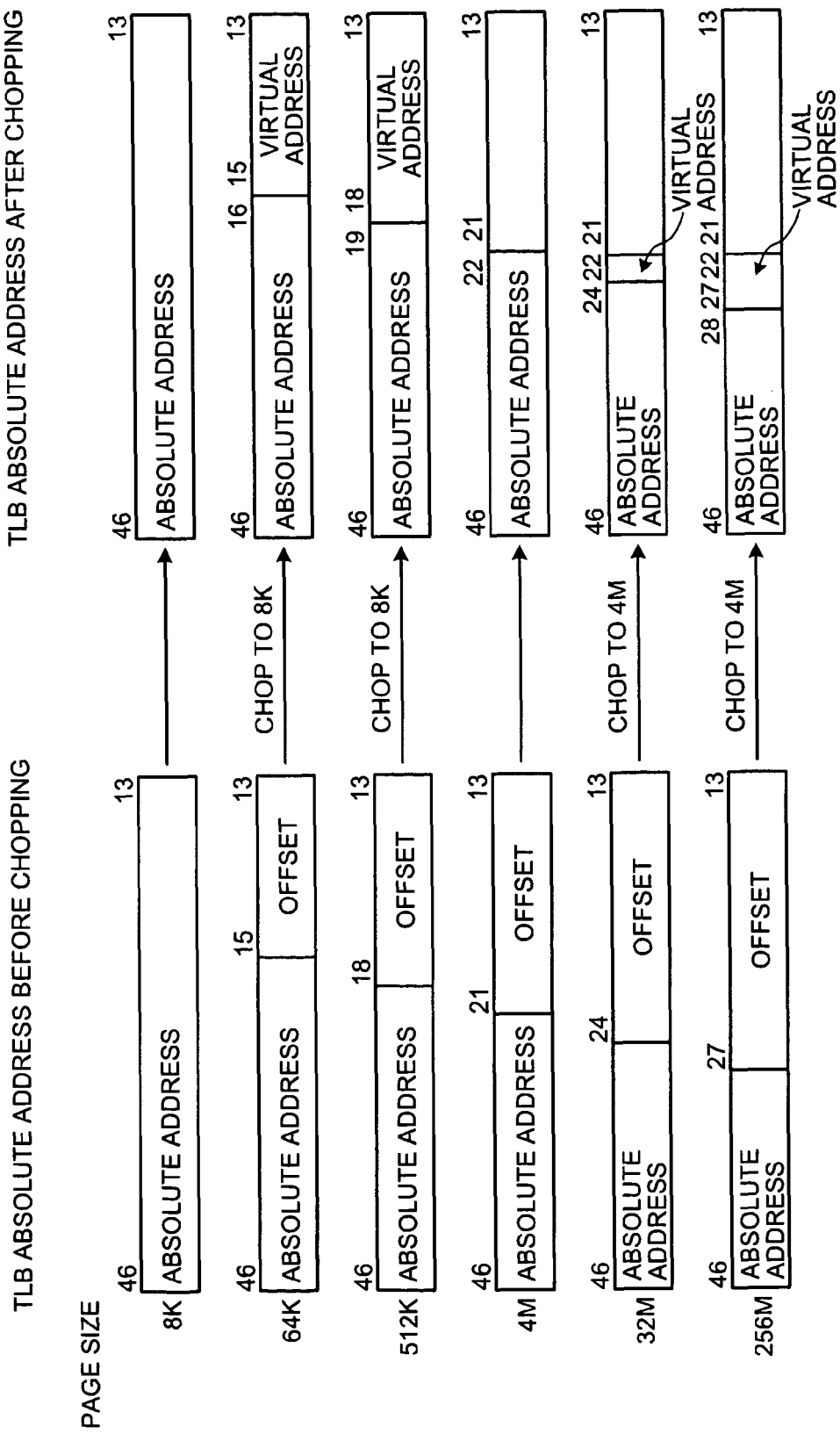
FIG. 3 is a schematic diagram illustrating absolute addresses before and after chopping.

The calculator adds the virtual address to the determined bit and adds chop information indicating that the address translation pair is chopped to a predetermined page size to the chopped address translation pair to register it to the micro TLB (see (3) in FIG. 3). To explain specifically with the above example, the calculator adds the virtual address (TLB virtual address) stored in the main TLB to the determined 15 bit to 13 bit and adds the chop information indicating that the page size of 64 K is chopped to 8 K to the chopped address translation pair of 8 K to register it to the micro TLB.

In the similar manner, when the address translation pair is output from the main TLB to the micro TLB, the calculator detects that the page size of the address translation pair output from the main TLB is 256 MByte (see (4) in FIG. 1). Then, when the page size of 256 M (or 32 M) is read from the main TLB and the page size is detected, the calculator chops the read address translation pair to the page size of 4 M, and determines the bit of the virtual address to be added to the absolute address included in the address translation pair, which is chopped to 4 M, to 27 bit to 22 bit (see (5) in FIG. 1). Then, the calculator adds the TLB virtual address stored in the main TLB to the determined 27 bit to 22 bit and adds the chop information indicating that the page size of 256 M is chopped to 4 M to the address translation pair that is chopped to 4 M to register it to the micro TLB (see (6) in FIG. 1).

Therefore, the address translation pair of which page size is any of 8 K and 4 M is registered in the micro TLB. In this state, upon receiving the address translation request from the operation unit or the instruction control unit of the processor, if the calculator receives the address translation request from the virtual address into the physical address from the processor, the calculator determines a search target bit of the address translation request for searching the address translation pairs registered in the micro TLB from the page size of the address translation pair registered in the micro TLB, and searches the micro TLB for the address translation pair in which the virtual address indicated by the determined search target bit is correlated with a context included in the address translation request (see (7) in FIG. 1).

Then, when the address translation pair in which the virtual address indicated by the search target bit and the context included in the address translation request are registered in a correlated manner is found from the micro TLB, the calculator calculates the absolute address from the address translation pair and responds to the processor. When the address translation pair is not found, the calculator sends the address translation request to the main TLB (see (8) in FIG. 1).

To explain specifically with the above example, upon receiving the address translation request from the operation unit or the instruction control unit, the calculator determines that a search target bit [63:22] of the virtual address in the case of the page size of 4 M stored in the micro TLB is the search target bit of the address translation request. Then, the calculator searches the micro TLB for the address translation pair that matches the search target bit [63:22] and a context [12:0] of the address translation request. When the matching address translation pair is found, the calculator refers to the chop information included in the address translation pair. When the chop information is 4 M, the calculator obtains an absolute address [46:22] of the searched address translation pair and responds to the operation unit or the instruction control unit. For example, when the original page size of the searched address translation pair is 32 M, a virtual address [24:22] is included in the absolute address [46:22] of the searched address translation pair. Therefore, the calculator calculates a correct absolute address from the absolute address [46:22] of the obtained address translation pair and the virtual address [24:22] included in the absolute address and responds to the operation unit or the instruction control unit.

When the chop information referred to is 8 K, the calculator obtains an absolute address [46:13] of the searched address translation pair and responds to the operation unit or the instruction control unit. For example, when the original page size of the searched address translation pair is 64 M, a virtual address [15:13] is included in the absolute address [46:13] of the searched address translation pair. Therefore, the calculator calculates a correct absolute address from the absolute address [46:13] of the obtained address translation pair and the virtual address [15:13] included in the absolute address and responds to the operation unit or the instruction control unit.

Detailed explanation of adding the virtual address to the chopped address translation pair and registering it is given. For example, when the address translation pair of which page size is 64 K is output from the main TLB to the micro TLB, the calculator chops the address translation pair of 64 K to 8 K. However, the address translation pair of 64 K has an absolute address [46:16] and an offset address [15:13], and the address translation pair of 8 K has an absolute address [46:13] and does not have an offset address. Therefore, when the address translation pair of which page size is 64 K is chopped to 8 K and is registered in the micro TLB, the calculator cannot respond with the correct absolute address. In other words, the absolute address of the address translation pair of which page size is 8 K registered in the micro TLB is [46:13], and the absolute address of the address translation pair of 64 K is [46:16], so that the number of bits of [15:13] is insufficient. Therefore, the TLB virtual address is added to the number of insufficient bits [15:13] to compensate for the number of bits of the absolute address.

In the similar manner, when the address translation pair of which page size is 256 M is output from the main TLB to the micro TLB, the calculator chops the address translation pair of 256 M to 4 M. However, the address translation pair of 256 M has an absolute address [46:28] and an offset address [27:13], and the address translation pair of 4 M has an absolute address [46:22] and an offset address [21:13]. Therefore, when the address translation pair of which page size is 256 M is chopped to 4 M and is registered in the micro TLB, the calculator cannot respond with the correct absolute address. In other words, the absolute address of the address translation pair of which page size is 4 M registered in the micro TLB is [46:22], and the absolute address of the address translation pair of 256 M is [46:28], so that the number of bits of [27:22] is insufficient. Therefore, the TLB virtual address is added to the number of insufficient bits [27:22] to compensate for the number of bits of the absolute address.

In this manner, the page sizes of 8 K, 64 K, and 512 K are all chopped to 8 K and the page sizes of 4 M, 32 M, and 256 M are all chopped to 4 M to be registered in the micro TLB, so that only the address translation pair of 8 K or 4 M is registered in the micro TLB. In the state, when the calculator receives the address translation request including a virtual address [63:13] and a context [12:0], the calculator first searches the micro TLB for the address translation pair that matches the virtual address [63:22] and the context [12:0] and of which page size is 4 M. When the address translation pair that matches the virtual address [63:22] and the context [12:0] is found, the calculator refers to the chop information of the address translation pair and judges whether the address translation pair is 8 K or 4 M.

When the address translation pair is determined to 4 M, the calculator responds with the absolute address under the condition of matching the virtual address [63:22] and the context [12:0]. However, when the address translation pair is determined to 8K, the calculator judges whether the virtual address [21:13] further matches. As above, in the conventional technology, because the bit position of the virtual address to be searched for is different in each of the page sizes of 8 K, 64 K, 512 K, 4 M, 32 M, and 256 M Bytes, so that searching needs to be performed corresponding to each page size; however, in the present invention, it is sufficient to perform searching corresponding to any one of the page sizes of 8 K and 4 M.

According to the calculator in the first embodiment, when registering the address translation pair output from the main TLB in the micro TLB, the address translation pair can be chopped to the page size of 8 K or 4 M to be registered. Consequently, as the main characteristics described above, the address comparison conditions can be reduced, so that the processing performance can be improved.

Configuration of Calculator

Figure 2:
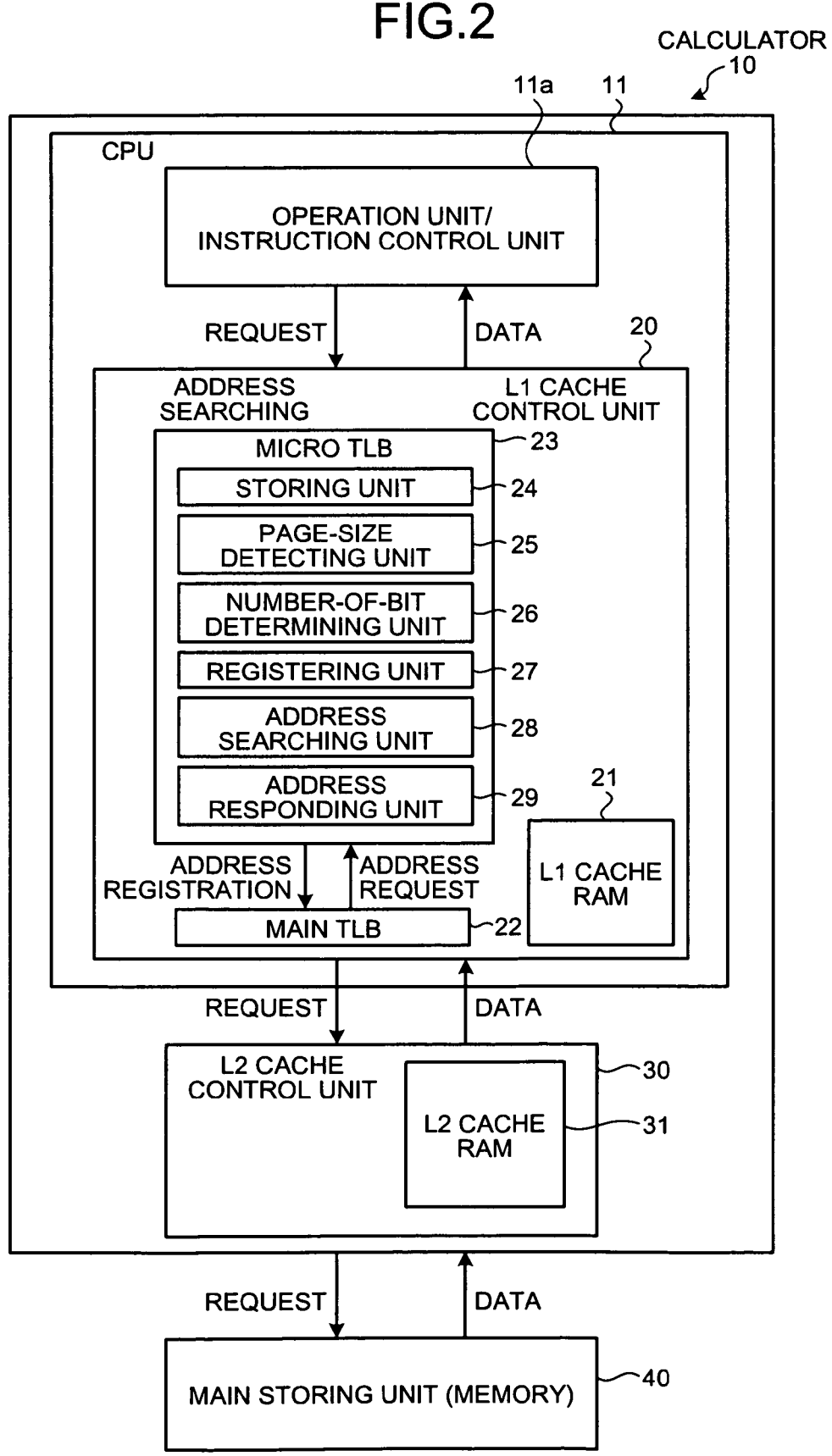
FIG. 2 is a block diagram illustrating a configuration of the calculator according to the first embodiment.

Next, the configuration of the calculator depicted in FIG. 1 is explained with reference to FIG. 2. FIG. 2 is a block diagram illustrating the configuration of the calculator according to the first embodiment. As depicted in FIG. 2, a calculator 10 includes an operation unit/instruction control unit 11a and an L1 cache control unit 20 included in a CPU 11, an L2 cache control unit 30, and a main storing unit 40.

The CPU 11 is a processing unit that executes various programs stored in the main storing unit 40, and includes the operation unit/instruction control unit 11a and the L1 cache control unit 20. Such programs include implementing a TLB control method in accordance with the embodiment, and the TLB control method can be provided as a TLB control program stored in a computer readable storage medium.

The operation unit/instruction control unit 11a outputs an instruction related to writing and readout of data corresponding to calculation processing executed by the CPU 11, obtains necessary data from a micro TLB 23, a main TLB 22, an L1 cache RAM 21, an L2 cache RAM 31, or the main storing unit 40, and performs calculation processing on the obtained data.

When the L1 cache control unit 20 obtains the virtual address from the operation unit/instruction control unit 11a, the L1 cache control unit 20 obtains corresponding data from the L1 cache RAM 21 and outputs it to the operation unit/instruction control unit 11a. When the corresponding data is not present in the L1 cache RAM 21, the L1 cache control unit 20 outputs an L2 cache address access to the L2 cache control unit 30. The L1 cache control unit 20 includes the L1 cache RAM 21, the main TLB 22, and the micro TLB 23.

The L1 cache RAM 21 is a fast small capacity memory that is integrated in or mounted on the module same as the CPU 11. The L1 cache RAM 21 is used for temporarily storing an instruction executed by the CPU 11 and data by storing frequently-used data. The L1 cache RAM 21 enables the CPU 11 to keep executing processing by supplying data of a certain amount until the main storing unit 40 catching up with supplying of new data.

The main TLB 22 stores therein a plurality of address translation pairs indicating a correspondence of the virtual address and the physical address arranged in a main storage as the page table. To give a specific example, when the address translation request is sent to the micro TLB 23 by the operation unit/instruction control unit 11a and the TLB miss occurs, the main TLB 22 receives the address translation request from the micro TLB 23 and responds to the address translation request with the physical address. Moreover, when the main TLB 22 does not store therein the physical address corresponding to the address translation request from the micro TLB 23, the main TLB 22 outputs the address translation request to the main storing unit 40.

The micro TLB 23 stores therein part of the page table stored in the main TLB, and includes a storing unit 24, a page-size detecting unit 25, a number-of-bit determining unit 26, a registering unit 27, an address searching unit 28, and an address responding unit 29 as units particularly closely related to the present invention.

The storing unit 24 stores therein the physical address that is registered by the registering unit 27 and is stored in the main TLB 22, the virtual address correlated to the physical address, and an effective context ID as an entry in a correlated manner. To give a specific example, the storing unit 24 stores therein a TAG unit composed of the virtual address [63:13] and the context [12:0] and a data unit composed of a physical address [46:13] and attributes [12:0] in a correlated manner.

When the address translation pair stored in the main TLB 22 is read and is registered in the micro TLB, the page-size detecting unit 25 detects the page size of the read address translation pair. To give a specific example, when the micro TLB miss occurs and the page-size detecting unit 25 receives the address translation pair output from the main TLB 22, the page-size detecting unit 25 detects whether the page size of the received address translation pair is 8 KByte, 64 KByte, 512 KByte, 4 MByte, 32 MByte, or 256 MByte.

The number-of-bit determining unit 26 chops the address translation pair read from the main TLB 22 to a predetermined page size in accordance with the page size detected by the page-size detecting unit 25, and determines the number of bits of the virtual address to be added to the absolute address included in the chopped address translation pair. To give a specific example, when the page size of the address translation pair read from the main TLB 22 is 8 K, the number-of-bit determining unit 26 notifies the registering unit 27 without chopping the address translation pair. When the page size of the address translation pair is 64 K, the number-of-bit determining unit 26 chops the address translation pair to 8 K and determines the number of bits of the virtual address to be added to [15:13]. When the page size of the address translation pair is 512 K, the number-of-bit determining unit 26 chops the address translation pair to 8 K and determines the number of bits of the virtual address to be added to [18:13]. The number-of-bit determining unit 26 notifies the registering unit 27 of the determined number of bits.

Moreover, when the page size of the address translation pair read from the main TLB 22 is 4 M, the number-of-bit determining unit 26 notifies the registering unit 27 without chopping the address translation pair. When the page size of the address translation pair is 32 M, the number-of-bit determining unit 26 chops the address translation pair to 4 M and determines the number of bits of the virtual address to be added to [24:22]. When the page size of the address translation pair is 256 M, the number-of-bit determining unit 26 chops the address translation pair to 4 M and determines the number of bits of the virtual address to be added to [27:22]. The number-of-bit determining unit 26 notifies the registering unit 27 of the determined number of bits.

The registering unit 27 adds the virtual address to the number of bits determined by the number-of-bit determining unit 26 and adds the chop information indicating that the address translation pair is chopped to a predetermined size to the chopped address translation pair to register in the micro TLB 23. To give a specific example, as depicted in FIG. 3, when 64 K is chopped to 8 K and the number of bits of the virtual address to be added is determined to [15:13] by the number-of-bit determining unit 26, the registering unit 27 adds the virtual address to [15:13]. When 512 K is chopped to 8 K and the number of bits of the virtual address to be added is determined to [18:13] by the number-of-bit determining unit 26, the registering unit 27 adds the virtual address to [18:13]. When 32 M is chopped to 4 M and the number of bits of the virtual address to be added is determined to [24:22] by the number-of-bit determining unit 26, the registering unit 27 adds the virtual address to [24:22]. When 256 M is chopped to 4 M and the number of bits of the virtual address to be added is determined to [27:22] by the number-of-bit determining unit 26, the registering unit 27 adds the virtual address to [27:22]. The registering unit 27 registers the number of bits to which the virtual address is added in the storing unit 24. FIG. 3 is a schematic diagram illustrating absolute addresses before and after the chopping.

When the address searching unit 28 receives the address translation request from the virtual address to the physical address from the processor, the address searching unit 28 determines the search target bit of the address translation request for searching the address translation pairs registered in the storing unit 24 of the micro TLB 23 from the chop information of the address translation pair registered in the storing unit 24 of the micro TLB 23, and searches the storing unit 24 of the micro TLB 23 for the address translation pair in which the virtual address indicated by the determined search target bit and the context included in the address translation request are registered in a correlated manner.

To give a specific example, when the address translation request is input from the operation unit/instruction control unit 11a of the processor (CPU), the address searching unit 28 searches the storing unit 24 for the address translation pair that matches [63:22] of the virtual address [63:13] included in the address translation request and the context [12:0]. When the matching address translation pair is found, the address searching unit 28 judges whether the chop information of the searched address translation pair is "8 K" or "4 M".

Then, when the chop information is "4 M", the address searching unit 28 notifies the address responding unit 29 that the address translation pair corresponding to the address translation request is found. When the chop information is "8 K", the address searching unit 28 judges whether the virtual address stored in [21:13] other than the previously-searched [63:22] in the virtual address [63:13] included in the address translation request matches the virtual address [21:13] of the searched address translation pair. When the virtual address stored in [21:13] other than the previously-searched [63:22] matches the virtual address [21:13] of the searched address translation pair, the address searching unit 28 notifies the address responding unit 29 that the address translation pair corresponding to the address translation request is found. When the virtual addresses do not match with each other, the address searching unit 28 notifies the address responding unit 29 of the TLB miss.

When the address translation pair in which the virtual address indicated by the search target bit and the context included in the address translation request are registered in a correlated manner is found by the address searching unit 28 from the micro TLB, the address responding unit 29 calculates the absolute address from the address translation pair and responds to the processor. When the address translation pair is not found, the address responding unit 29 sends the address translation request to the main TLB 22.

To give a specific example, when the address responding unit 29 is notified that the address translation pair corresponding to the address translation request is found, the address responding unit 29 refers to the chop information of the notified address translation pair. When the chop information is "8 K", the address responding unit 29 obtains the absolute address [46:13] of the address translation pair. When the chop information is "4 M", the address responding unit 29 obtains the absolute address [46:22] of the address translation pair. Then, the address responding unit 29 calculates a correct absolute address from the obtained absolute address and the virtual address included in the absolute address and responds to the operation unit/instruction control unit 11a.

On the other hand, when the address responding unit 29 is notified that the address translation pair corresponding to the address translation request is not found (micro TLB miss), the address responding unit 29 sends the address translation request to the main TLB.

The L2 cache control unit 30 includes the L2 cache RAM 31. When the L2 cache control unit 30 obtains the L2 cache access address from the L1 cache control unit 20, the L2 cache control unit 30 reads data corresponding to the obtained L2 cache access address from the L2 cache RAM 31 and outputs it to the L1 cache control unit 20. The L2 cache RAM 31 is a memory that is slower than the L1 cache RAM 21 and is faster than the main storing unit 40 and of which capacity is larger than the L1 cache RAM 21 and is smaller than the main storing unit 40. The L2 cache control unit 30 stores therein frequently-used data.

The main storing unit 40 is a large capacity main memory that stores therein data used by the CPU 11, instructions, and a translation table (page table) from the virtual address to the physical address. The main storing unit 40 responds to the request from the operation unit/instruction control unit 11a or the L1 cache control unit 20 of the CPU 11, or the L2 cache control unit 30 and responds to a request destination processing unit with corresponding data.

Circuit Configuration of Micro TLB in Calculator

Figure 4:
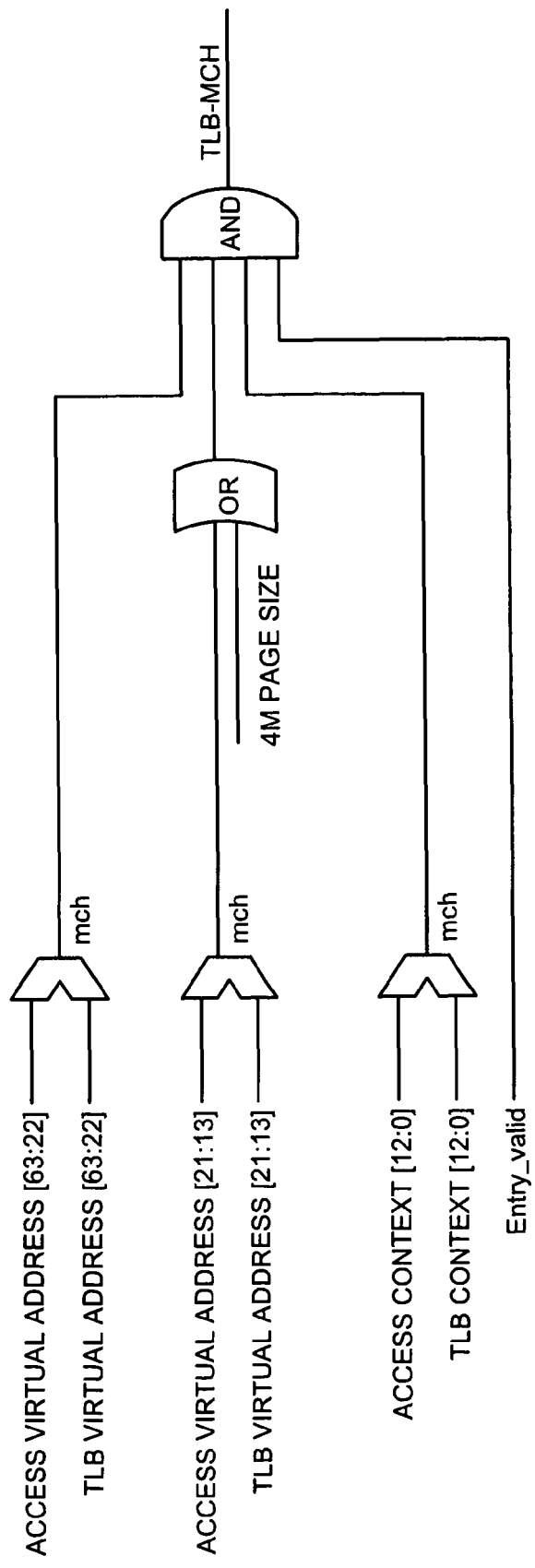
FIG. 4 is a schematic diagram for explaining a circuit configuration of a micro TLB in the calculator according to the first embodiment.

Next, the circuit configuration of the micro TLB in the calculator is explained with reference to FIG. 4. FIG. 4 is a schematic diagram for explaining the circuit configuration of the micro TLB in the calculator according to the first embodiment. The TLB virtual address and the TLB context depicted in FIG. 4 indicate the virtual address and the context registered in the micro TLB, respectively, and the access virtual address and the access context indicate the virtual address and the context included in the address translation request output from the operation unit/instruction control unit 11a, respectively.

As depicted in FIG. 4, the micro TLB 23 includes a circuit that compares an access virtual address [63:22] that is the virtual address area common in the page sizes of 8 K and 4 M and a TLB virtual address [63:22], a circuit that compares an access virtual address [21:13] that is the virtual address area when the page size is 8 K and a TLB virtual address [21:13], a circuit that compares an access context [12:0] and a TLB context [12:0], and an Entry valid for inputting whether the entry is valid or invalid.

Figure 8:
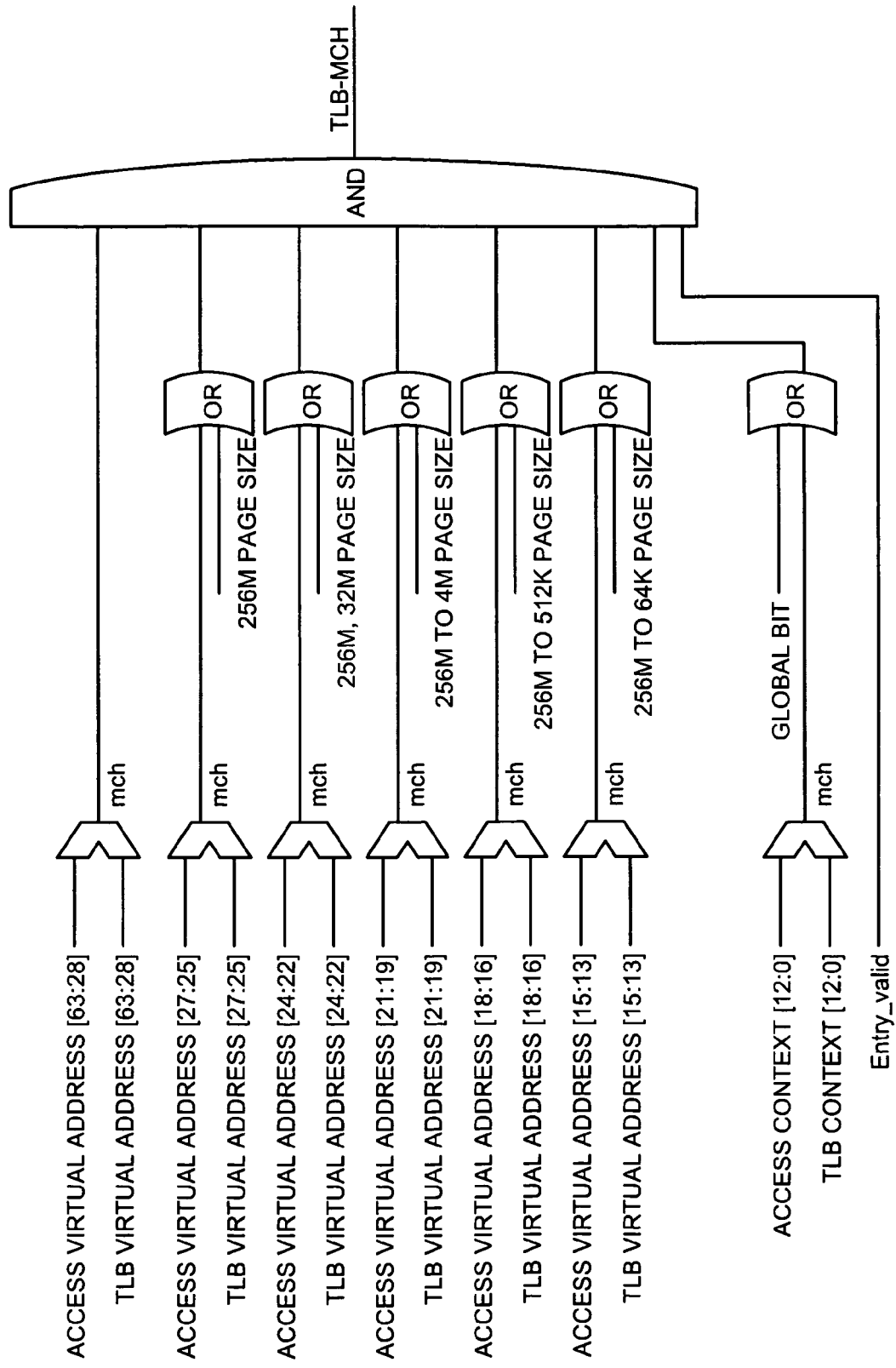
FIG. 8 is a schematic diagram illustrating an example of an address translation pair searching circuit in the conventional technology.

A circuit for inputting whether the page size is 4M is connected to the circuit that compares the access virtual address [21:13] and the TLB virtual address [21:13], and this circuit is not operated when the page size is 4 M. When the access virtual address [63:22] matches the TLB virtual address [63:22], the access virtual address [21:13] matches the TLB virtual address [21:13] (valid only in the case of 8 K), the access context [12:0] matches the TLB context [12:0], and further the matching address translation pair is valid, the micro TLB 23 obtains the absolute address and responds to the operation unit/instruction control unit 11a. In this manner, as is apparent from comparison with a comparison circuit of the conventional technology depicted in FIG. 8, this embodiment can significantly reduce comparison circuits.

Processing by Calculator

Figure 5:
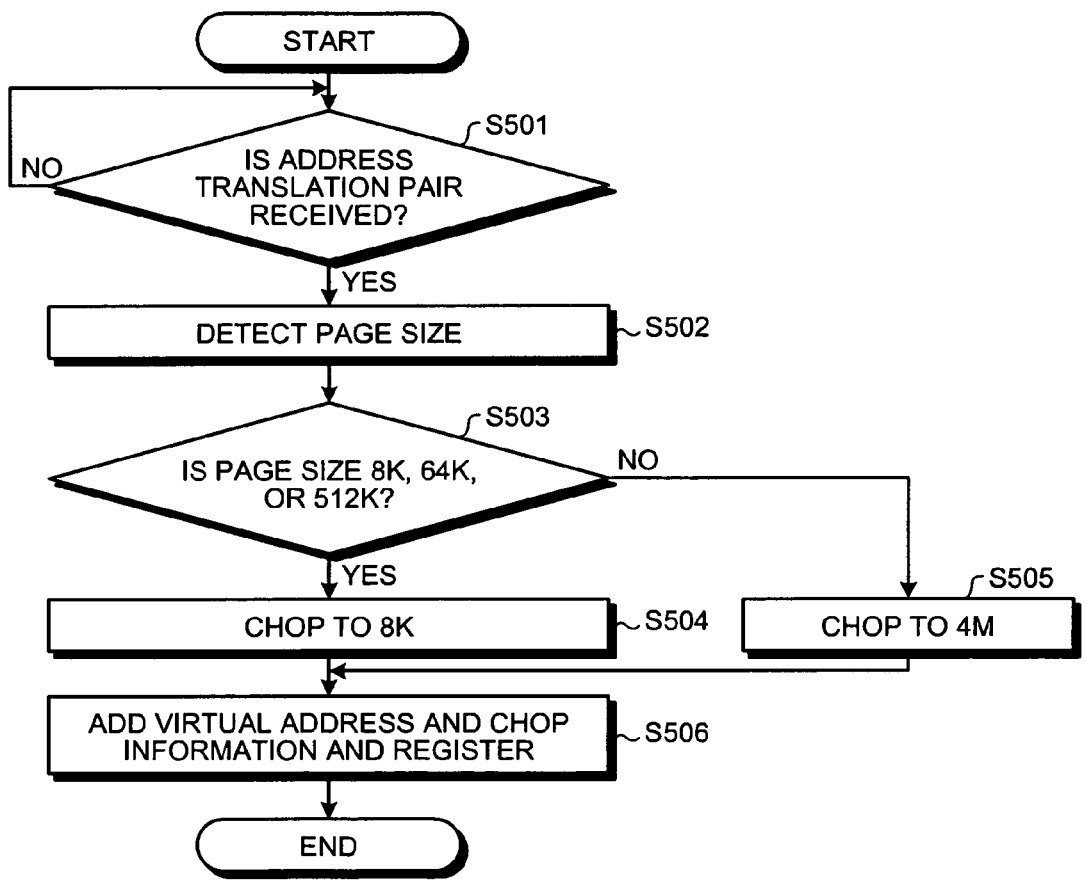
FIG. 5 is a flowchart representing a flow of an address translation pair registering process of the micro TLB in the calculator according to the first embodiment.
Figure 6:
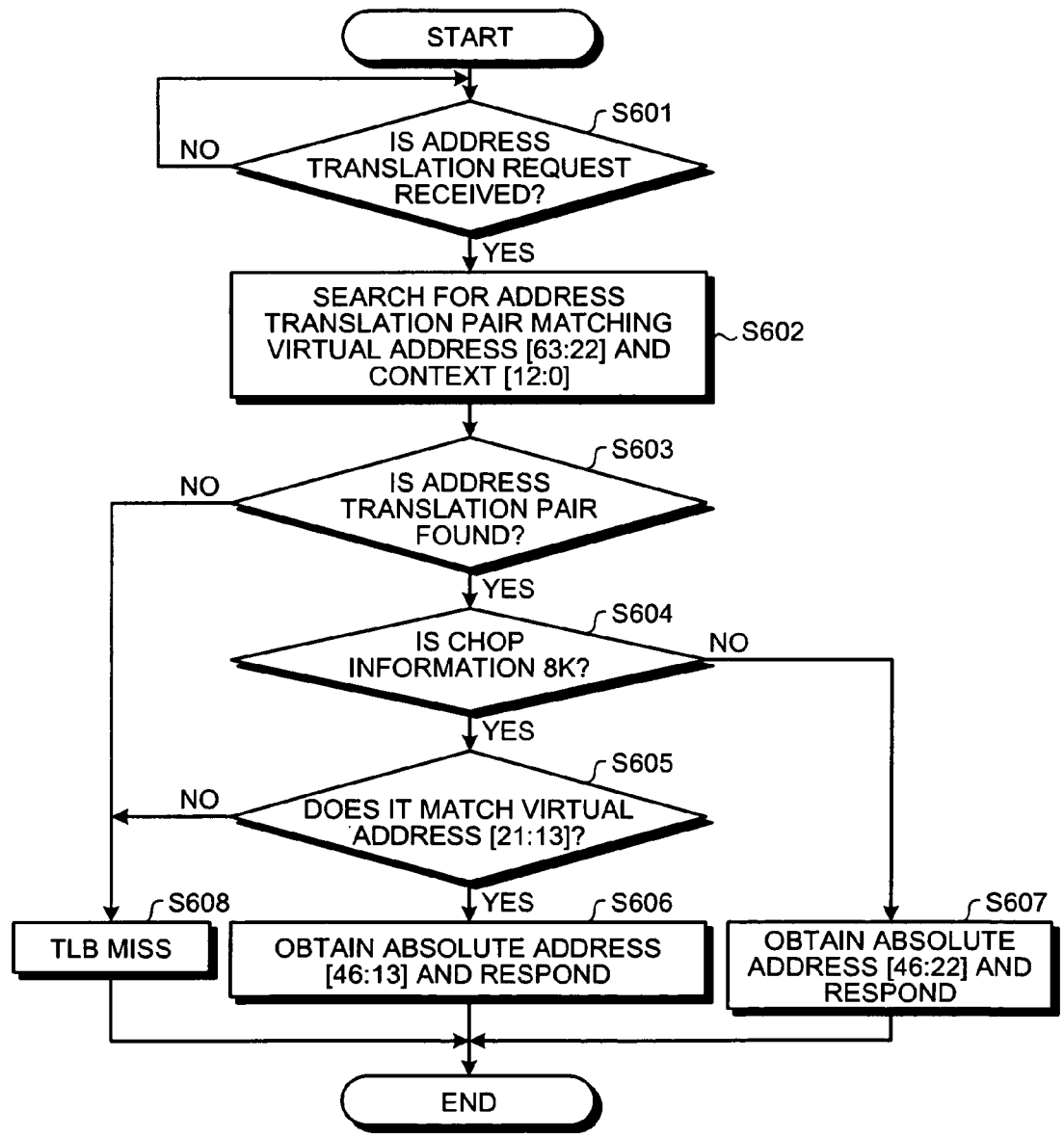
FIG. 6 is a flowchart representing a flow of an address translation pair searching process of the micro TLB in the calculator according to the first embodiment.
Figure 7:
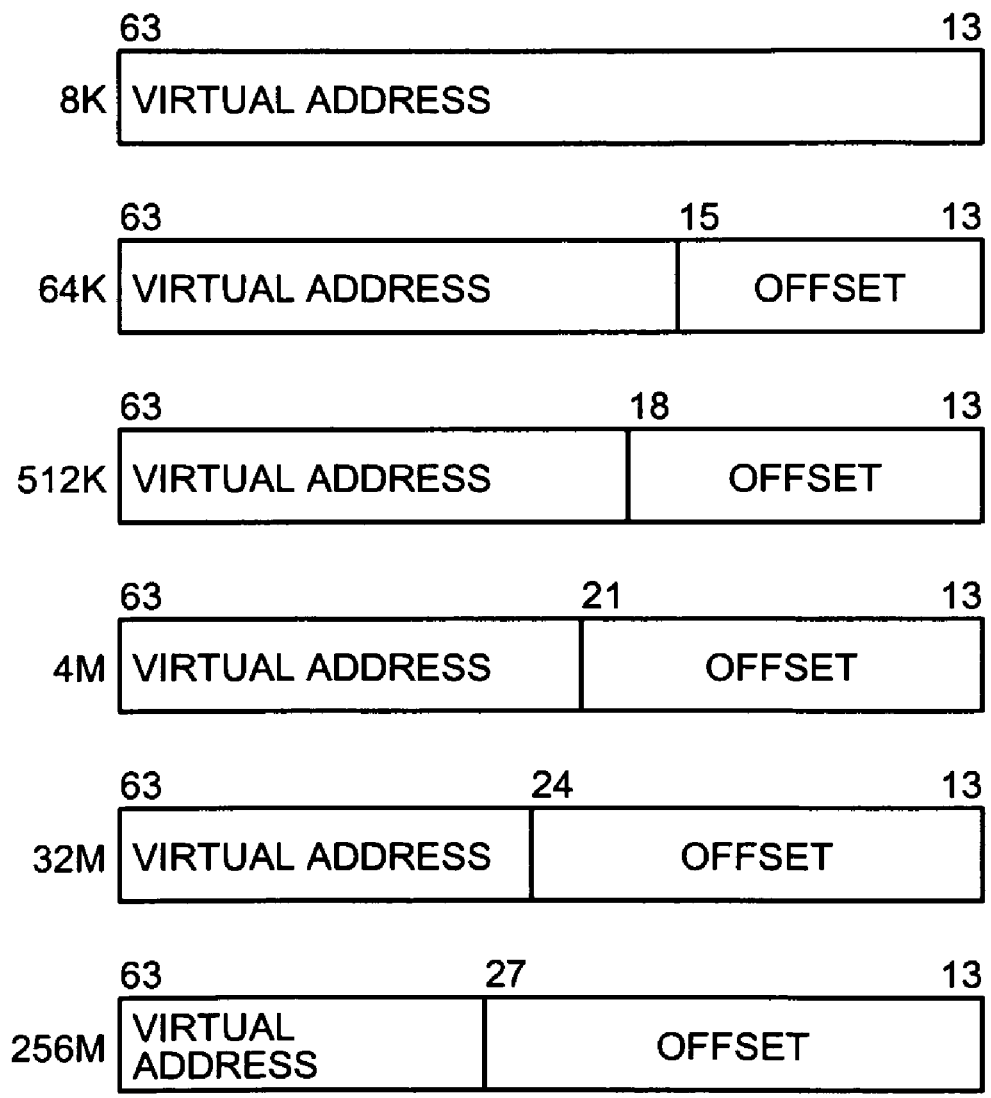
FIG. 7 is a schematic diagram for explaining a conventional technology.

Next, the processing by the calculator is explained with reference to FIG. 5 and FIG. 6. FIG. 5 is a flowchart representing a flow of an address translation pair registering process to the micro TLB in the calculator according to the first embodiment. FIG. 6 is a flowchart representing a flow of an address translation pair searching process of the micro TLB in the calculator according to the first embodiment.

Entry Registering Process

As depicted in FIG. 5, when the micro TLB miss with respect to the address translation pair input from the operation unit/instruction control unit 11a occurs, and the address translation pair is sent to the micro TLB 23 in the response to the address translation request from the main TLB 22 (Yes at Step S501), the page-size detecting unit 25 detects the page size of the read address translation pair (Step S502).

When the detected page size is 8 K, 64 K, or 512 K (Yes at Step S503), the number-of-bit determining unit 26 chops the address translation pair to 8 K (Step S504) and determines the number of bits of the virtual address to be added to the absolute address included in the chopped address translation pair, and the registering unit 27 adds the virtual address for the number of bits determined by the number-of-bit determining unit 26 and the chop information to the address translation pair and registers it to the storing unit 24 of the micro TLB 23 (Step S506).

On the other hand, when the detected page size is not any one of 8 K, 64 K, and 512 K, i.e., when the detected page size is 4 M, 32 M, or 256 M (Yes at Step S503), the number-of-bit determining unit 26 chops the address translation pair to 4 M and determines the number of bits of the virtual address to be added to the absolute address included in the chopped address translation pair, and the registering unit 27 adds the virtual address for the number of bits determined by the number-of-bit determining unit 26 and the chop information to the address translation pair and registers it to the storing unit 24 of the micro TLB 23 (Step S506).

Entry Searching Process

As depicted in FIG. 6, upon receiving the address translation request from the operation unit/instruction control unit 11a (Yes at Step S601), the address searching unit 28 of the micro TLB 23 searches the storing unit 24 for the address translation pair that matches [63:22] of the virtual address [63:13] included in the address translation request and the context [12:0] (Step S602).

When a matching address translation pair is found (Yes at Step S603), the address searching unit 28 judges whether the chop information of the searched address translation pair is 8K (Step S604).

When the chop information of the searched address translation pair is 8 K (Yes at Step S604), the address responding unit 29 judges whether the number of remaining bits [21:13] of the virtual address [63:13] included in the address translation request matches the virtual address [21:13] of the searched address translation pair (Step S605).

When the virtual address [21:13] matches (Yes at Step S605), the address responding unit 29 obtains the absolute address [46:13] from the searched address translation pair, calculates the absolute address, and responds to the operation unit/instruction control unit 11a (Step S606).

Returning to Step S604, when the chop information of the searched address translation pair is not 8 K. i.e., when the chopping information is 4 M (No at Step S604), the address responding unit 29 obtains the absolute address [46:22] from the searched address translation pair, calculates the absolute address, and responds to the operation unit/instruction control unit 11a (Step S607).

On the other hand, when a matching address translation pair is not found (No at Step S603), or when the virtual address [21:13] does not match (No at Step S605), the address responding unit 29 regards it as the micro TLB miss and sends the address translation request to the main TLB 22 (Step S608).

Effect of First Embodiment

According to the first embodiment, when the address translation pair stored in the main TLB 22 is read to be registered in the micro TLB 23, the page size of the read address translation pair is detected, the read address translation pair is chopped in accordance with the detected page size, the number of bits of the virtual address to be added to the absolute address included in the chopped address translation pair is determined, and the virtual address is added with respect to the determined number of bits and the chop information indicating that the address translation pair is chopped to a predetermined size is added to the chopped address translation pair to be registered in the micro TLB 23. When the address translation request from the virtual address to the physical address is received from the processor (CPU), the search target bit of the address translation request for searching the address translation pairs registered in the micro TLB 23 is determined from the chop information of the address translation pair registered in the micro TLB 23, and the address translation pair in which the virtual address indicated by the determined search target bit and the context included in the address translation request are registered in a correlated manner is searched for from the micro TLB 23. When the address translation pair in which the virtual address indicated by the search target bit and the context included in the address translation request are registered in a correlated manner is found from the micro TLB 23, the absolute address is calculated from the address translation pair to respond to the processor. When the address translation pair is not found, the address translation request is sent to the main TLB 22. Therefore, the address comparison conditions can be reduced, enabling to improve the processing performance.

For example, because only the address translation pairs of a predetermined page size are registered in the micro TLB 23, it is sufficient to search for the virtual address corresponding to the predetermined page size, so that the address comparison conditions can be reduced compared with the case in which various page sizes are registered, enabling to improve the processing performance.

Moreover, according to the first embodiment, the page size of the read address translation pair is detected from any one of 8 K, 64 K, 512 K, 4 M, 32 M, and 256 MBytes. When it is detected that the page size of the read address translation pair is 64 K, the read address translation pair is chopped to 8 K and the number of bits of the virtual address to be added to the absolute address included in the chopped address translation pair is determined to 15 bit to 13 bit. When it is detected that the page size of the address translation pair is 512 K, the read address translation pair is chopped to 8 KBytes and the number of bits of the virtual address to be added to the absolute address included in the chopped address translation pair is determined to 18 bit to 13 bit. When it is detected that the page size of the read address translation pair is 32 M, the read address translation pair is chopped to 4 MByte and the number of bits of the virtual address to be added to the absolute address included in the chopped address translation pair is determined to 24 bit to 22 bit. When it is detected that the page size of the read address translation pair is 256 M, the read address translation pair is chopped to 4 MByte and the number of bits of the virtual address to be added to the absolute address included in the chopped address translation pair is determined to 27 bit to 22 bit. When it is detected that the page size of the read address translation pair is 8 K or 4 M, the number of bits of the virtual address to be added to the absolute address included in the chopped address translation pair is determined to 0 bit without chopping the read address translation pair. When the address translation request is received from the processor, the search target bit of the address translation request corresponding to 8 K or 4 M is determined from the chop information of the address translation pair registered in the micro TLB 23 and the address translation pair in which the virtual address indicated by the determined search target bit and the context included in the address translation request are registered in a correlated manner is searched for from the micro TLB 23. Therefore, the address comparison condition can be reduced, enabling to improve the processing performance.

For example, if the page size of the address translation pair is 8 KByte, 64 KByte, or 512 KByte, the address translation pair is chopped to 8 K, and if the page size of the address translation pair is 4 MByte, 32 MByte, or 256 MByte, the address translation pair is chopped to 4 M. The chopped address translation pair is registered in the micro TLB 23. Therefore, only the address translation pairs of which page size is 8 K or 4 M are stored in the micro TLB 23. Thus, upon receiving the address translation request, it is sufficient that the micro TLB 23 searches the address translation pairs stored in the micro TLB 23 with any of two patterns of the virtual address [63:22] in the case where the page size is 4 M and the virtual address [21:13] in the case where the page size is 8 K, so that the address comparison conditions can be reduced, enabling to improve the processing performance.

[b] Second Embodiment

The embodiment of the present invention is explained above; however, the present invention can be performed in various different forms other than the above embodiment. Different embodiments of the system configuration and the like are explained below.

(1) System Configuration and the Like

In each processing explained in the present embodiment, all or part of the processing explained as automatically performed (for example, output processing of the address translation pair (entry) including the physical address from the main storing unit) can be performed manually. Moreover, information including the processing procedure, the control procedure, the specific names, and the various parameters in the specification or the drawings can be arbitrary changed unless otherwise specifically described.

Furthermore, each of the components of the apparatuses depicted in the drawings is functionally and conceptually drawn, and is not necessarily formed physically in exactly the same manner as depicted in the drawings. In other words, the specific form of division or integration of each apparatus is not limited to the one depicted in the drawings. The configuration can be such that all or part thereof are functionally or physically divided or integrated (for example, integrating the page-size detecting unit with the number-of-bit determining unit) in arbitrary units according to various loads or the status of use.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A calculator comprising:
a main TLB that stores therein a plurality of address translation pairs indicating a correspondence of a virtual address and an absolute address as a page table;
a micro TLB that stores therein part of the page table stored in the main TLB;
a page-size detecting unit that, when an address translation pair stored in the main TLB is read and is registered in the micro TLB, detects a page size of the read address translation pair;
a number-of-bit determining unit that chops the read address translation pair to reduce the page size detected by the page-size detecting unit to a predetermined page size by attaching a part of offset bits, in accordance with the page size detected by the page-size detecting unit, to a page address, the offset bits and the page address being included in the read address translation pair, wherein the number of predetermined page sizes is less than the number of page sizes detected by the page-size detecting unit, and determines the number of bits of a virtual address to be added to an absolute address included in the chopped address translation pair;
a registering unit that adds the virtual address with respect to the number of bits determined by the number-of-bit determining unit and adds chop information indicating that the address translation pair is chopped to the predetermined size to the chopped address translation pair to register in the micro TLB;
an address searching unit that, when receiving an address translation request from the virtual address into the physical address from a processor, determines a search target bit of the address translation request for searching address translation pairs registered in the micro TLB from the chop information of the address translation pair registered in the micro TLB by the registering unit, and searches the micro TLB for an address translation pair in which a virtual address indicated by the determined search target bit and a context included in the address translation request are registered in a correlated manner; and
an address responding unit that, when the address translation pair in which the virtual address indicated by the search target bit and the context included in the address translation request are registered in a correlated manner is found from the micro TLB by the address searching unit, calculates an absolute address from the address translation pair and responds to the processor, and, when the address translation pair is not found by the address searching unit, sends the address translation request to the main TLB.

2. The calculator according to claim 1, wherein
the number-of-bit determining unit chops the read address translation pair to a first size and determines that the number of bits of the virtual address to be added to the absolute address included in the chopped address translation pair is 15 bit to 13 bit when the page-size detecting unit detects that the page size of the read address translation pair is a second size, chops the read address translation pair to the first size and determines that the number of bits of the virtual address to be added to the absolute address included in the chopped address translation pair is 18 bit to 13 bit when the page-size detecting unit detects that the page size of the read address translation pair is a third size, chops the read address translation pair to a fourth size and determines that the number of bits of the virtual address to be added to the absolute address included in the chopped address translation pair is 24 bit to 22 bit when the page-size detecting unit detects that the page size of the read address translation pair is a fifth size, chops the read address translation pair to the fourth size and determines that the number of bits of the virtual address to be added to the absolute address included in the chopped address translation pair is 27 bit to 22 bit when the page-size detecting unit detects that the page size of the read address translation pair is 256 MByte, and determines that the number of bits of the virtual address to be added to the absolute address included in the chopped address translation pair is 0 bit without chopping the read address translation pair when the page-size detecting unit detects that the page size of the read address translation pair is the first size or the fourth size, and the address searching unit, when receiving the address translation request from the processor, determines the search target bit of the address translation request corresponding to the first size or the fourth size from the chop information of the address translation pair registered in the micro TLB by the registering unit, and searches the micro TLB for the address translation pair in which the virtual address indicated by the determined search target bit and the context included in the address translation request are registered in a correlated manner.

3. A TLB control method suitable for a calculator that includes a main TLB that stores therein a plurality of address translation pairs indicating a correspondence of a virtual address and an absolute address as a page table and a micro TLB that stores therein part of the page table stored in the main TLB, the TLB control method comprising:

detecting, when an address translation pair stored in the main TLB is read and is registered in the micro TLB, a page size of the read address translation pair;

chopping the read address translation pair to reduce the page size detected at the detecting to a predetermined page size by attaching a part of offset bits, in accordance with the detected page size, to a page address, the offset bits and the page address being included in the read address translation pair, wherein the number of predetermined page sizes is less than the number of page sizes detected at the detecting, and determining the number of bits of a virtual address to be added to an absolute address included in the chopped address translation pair;

adding the virtual address with respect to the determined number of bits and adding chop information indicating that the address translation pair is chopped to the predetermined size to the chopped address translation pair to register in the micro TLB;

determining, when receiving an address translation request from the virtual address into the physical address from a processor, a search target bit of the address translation request for searching address translation pairs registered in the micro TLB from the chop information of the address translation pair registered in the micro TLB, and searching the micro TLB for an address translation pair in which a virtual address indicated by the determined search target bit and a context included in the address translation request are registered in a correlated manner; and calculating, when the address translation pair in which the virtual address indicated by the search target bit and the context included in the address translation request are registered in a correlated manner is found from the micro TLB at the searching, an absolute address from the address translation pair and responding to the processor, and, sending, when the address translation pair is not found at the searching, the address translation request to the main TLB.

4. The TLB control method according to claim 3, wherein the determining includes chopping the read address translation pair to a first size and determining that the number of bits of the virtual address to be added to the absolute address included in the chopped address translation pair is 15 bit to 13 bit when it is detected that the page size of the read address translation pair is a second size at the detecting, chopping the read address translation pair to the first size and determining that the number of bits of the virtual address to be added to the absolute address included in the chopped address translation pair is 18 bit to 13 bit when it is detected that the page size of the read address translation pair is a third size at the detecting, chopping the read address translation pair to a fourth size and determining that the number of bits of the virtual address to be added to the absolute address included in the chopped address translation pair is 24 bit to 22 bit when it is detected that the page size of the read address translation pair is a fifth size at the detecting, chopping the read address translation pair to the fourth size and determining that the number of bits of the virtual address to be added to the absolute address included in the chopped address translation pair is 27 bit to 22 bit when it is detected that the page size of the read address translation pair is a sixth size at the detecting, and determining that the number of bits of the virtual address to be added to the absolute address included in the chopped address translation pair is 0 bit without chopping the read address translation pair when it is detected that the page size of the read address translation pair is the first size or the fourth size at the detecting, and the searching includes, when receiving the address translation request from the processor, determining the search target bit of the address translation request corresponding to the first size or the fourth size from the chop information of the address translation pair registered in the micro TLB, and searching the micro TLB for the address translation pair in which the virtual address indicated by the determined search target bit and the context included in the address translation request are registered in a correlated manner.

5. A non-transitory computer readable storage medium having stored therein a TLB control program, the TLB control program causing a computer that is a calculator that includes a main TLB that stores therein a plurality of address translation pairs indicating a correspondence of a virtual address and an absolute address as a page table and a micro TLB that stores therein part of the page table stored in the main TLB, to execute a process comprising:

detecting, when an address translation pair stored in the main TLB is read and is registered in the micro TLB, a page size of the read address translation pair;

chopping the read address translation pair to reduce the page size detected at the detecting to a predetermined page size by attaching a part of offset bits, in accordance with the detected page size, to a page address, the offset bits and the page address being included in the read address translation pair, wherein the number of predetermined page sizes is less than the number of page sizes detected at the detecting, and determining the number of bits of a virtual address to be added to an absolute address included in the chopped address translation pair;

adding the virtual address with respect to the determined number of bits and adding chop information indicating that the address translation pair is chopped to the predetermined size to the chopped address translation pair to register in the micro TLB;

determining, when receiving an address translation request from the virtual address into the physical address from a processor, a search target bit of the address translation request for searching address translation pairs registered in the micro TLB from the chop information of the address translation pair registered in the micro TLB, and searching the micro TLB for an address translation pair in which a virtual address indicated by the determined search target bit and a context included in the address translation request are registered in a correlated manner; and calculating, when the address translation pair in which the virtual address indicated by the search target bit and the context included in the address translation request are registered in a correlated manner is found from the micro TLB at the searching, an absolute address from the address translation pair and responding to the processor, and, sending, when the address translation pair is not found at the searching, the address translation request to the main TLB.

6. The non-transitory computer readable storage medium according to claim 5, wherein the determining includes chopping the read address translation pair to a first size and determining that the number of bits of the virtual address to be added to the absolute address included in the chopped address translation pair is 15 bit to 13 bit when it is detected that the page size of the read address translation pair is a second size at the detecting, chopping the read address translation pair to the first size and determining that the number of bits of the virtual address to be added to the absolute address included in the chopped address translation pair is 18 bit to 13 bit when it is detected that the page size of the read address translation pair is a third size at the detecting, chopping the read address translation pair to a fourth size and determining that the number of bits of the virtual address to be added to the absolute address included in the chopped address translation pair is 24 bit to 22 bit when it is detected that the page size of the read address translation pair is a fifth size at the detecting, chopping the read address translation pair to the fourth size and determining that the number of bits of the virtual address to be added to the absolute address included in the chopped address translation pair is 27 bit to 22 bit when it is detected that the page size of the read address translation pair is a sixth size at the detecting, and determining that the number of bits of the virtual address to be added to the absolute address included in the chopped address translation pair is 0 bit without chopping the read address translation pair when it is detected that the page size of the read address translation pair is the first size or the fourth size at the detecting, and the searching includes, when receiving the address translation request from the processor, determining the search target bit of the address translation request corresponding to the first size or the fourth size from the chop information of the address translation pair registered in the micro TLB, and searching the micro TLB for the address translation pair in which the virtual address indicated by the determined search target bit and the context included in the address translation request are registered in a correlated manner.

\* \* \* \* \*